United States Patent
Sugita et al.

(10) Patent No.: US 9,324,304 B2
(45) Date of Patent: Apr. 26, 2016

(54) INFORMATION DISPLAY APPARATUS, METHOD THEREOF AND PROGRAM THEREOF

(71) Applicant: KABUSHIKI KAISHA TOSHIBA, Tokyo (JP)

(72) Inventors: Kaoru Sugita, Saitama (JP); Masashi Nishiyama, Kanagawa (JP); Masahiro Sekine, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 178 days.

(21) Appl. No.: 13/674,228

(22) Filed: Nov. 12, 2012

(65) Prior Publication Data

US 2013/0127906 A1    May 23, 2013

(30) Foreign Application Priority Data

Nov. 11, 2011   (JP) .................. 2011-247697

(51) Int. Cl.
  *G06T 7/00*   (2006.01)
  *G09G 5/377*   (2006.01)
  *G06K 9/62*   (2006.01)

(52) U.S. Cl.
  CPC .............. *G09G 5/377* (2013.01); *G06K 9/6211* (2013.01); *G06T 7/001* (2013.01); *G06T 2207/30108* (2013.01); *G09G 2340/12* (2013.01)

(58) Field of Classification Search
  USPC ................... 345/629–641; 382/151, 190–209
  See application file for complete search history.

(56) References Cited

U.S. PATENT DOCUMENTS

2004/0165775 A1* 8/2004 Simon .................. G06T 7/0018
                                          382/181
2005/0057620 A1  3/2005 Kimura et al.
              (Continued)

FOREIGN PATENT DOCUMENTS

| JP | 2005-186342 |   | 7/2005 |
|----|-------------|---|--------|
| JP | 2009-150866 |   | 7/2009 |
| JP | 2011-130652 |   | 6/2011 |
| JP | 2011130652  | * | 6/2011 |

OTHER PUBLICATIONS

Maria Carolina Vanegas et al., Searching Aligned Groups of Objects with Fuzzy Criteria, Computational Intelligence for Knowledge-Based Systems Design Lecture Notes in Computer Science vol. 6178, 2010, pp. 605-613.*

(Continued)

*Primary Examiner* — Ming Hon
*Assistant Examiner* — Phuc Doan
(74) *Attorney, Agent, or Firm* — Nixon & Vanderhye, P.C.

(57) ABSTRACT

An information display apparatus creates determination image which indicates the fact that a reference object in a plurality of objects arranged in a row satisfies a predetermined rule or that the reference object does not satisfy the rule, creates an image to be displayed by superimposing the determination image on the acquired image, and displays the image to be displayed.

6 Claims, 9 Drawing Sheets

(56) References Cited

U.S. PATENT DOCUMENTS

| | | | |
|---|---|---|---|
| 2006/0184013 A1* | 8/2006 | Emanuel | G01S 5/16 600/426 |
| 2009/0109241 A1* | 4/2009 | Tsujimoto | 345/633 |
| 2009/0141964 A1 | 6/2009 | Magara | |
| 2009/0271675 A1* | 10/2009 | Dickson et al. | 714/732 |
| 2010/0008584 A1* | 1/2010 | Brown et al. | 382/190 |
| 2011/0254861 A1* | 10/2011 | Emura et al. | 345/633 |
| 2012/0044264 A1* | 2/2012 | Lee | G01C 21/20 345/633 |
| 2013/0212434 A1* | 8/2013 | Janky et al. | 714/27 |

OTHER PUBLICATIONS

Bloch, Directional relative position between objects in image processing: a comparison between fuzzy approaches, Pattern Recognition 36 (2003) 1563-1582.*

Chen, Mobile Augmented Reality for Books on a Shelf, Multimedia and Expo (ICME), 2011.*

Office Action mailed Dec. 9, 2014 in counterpart Japanese Patent Application No. 2011-247697 and English-language translation thereof.

* cited by examiner

```
IMAGE ACQUIRING PROCESS  — S301
          ↓
    RECOGNIZING PROCESS   — S302
          ↓
    DETERMINING PROCESS   — S303
          ↓
    INTEGRATING PROCESS   — S304
          ↓
    SUPERIMPOSING PROCESS — S305
          ↓
     DISPLAYING PROCESS   — S306
```

FIG. 4

FRAME NUMBER : 0023

CABLE BAR CODE

| CODE ID | IMAGE COORDINATE VALUE |
|---------|------------------------|
| 001     | (100, 200)             |
| 002     | (150, 200)             |
| 004     | (200, 200)             |

TERMINAL BLOCK BAR CODE

| CODE ID | IMAGE COORDINATE VALUE |
|---------|------------------------|
| A0101   | (100, 50)              |
| A0102   | (300, 50))             |
| A0103   | (500, 50))             |

FIG. 5

TERMINAL BLOCK NUMBER : A01

CABLE RULE

| CABLE RULE ID | CABLE REFERENCE BAR CODE | CABLE TARGET BAR CODE | RELATIVE POSITION | DETECTION COORDINATE SYSTEM ID |
|---|---|---|---|---|
| 1 | 001 | 002 | (0.9, -0.1)-(1.1, 0.1) | 1 |
| 2 | 002 | 003 | (0.9, -0.1)-(1.1, 0.1) | 1 |
| 3 | 003 | 004 | (0.9, -0.1)-(1.1, 0.1) | 1 |

TERMINAL BLOCK RULE

| DETECTION COORDINATE SYSTEM ID | TERMINAL BLOCK REFERENCE BAR CODE | TERMINAL BLOCK TARGET BAR CODE | DIRECTION VECTOR |
|---|---|---|---|
| 1 | A0101 | A0102 | (3, 0) |
| 2 | A0102 | A0103 | (3, 0) |
| 3 | A0103 | A0104 | (3, 0) |

| RULE ID | REFERENCE BAR CODE | TARGET BAR CODE | DIRECTION VECTOR |
|---|---|---|---|
| 1 | 001 | 002 | (1, 0) |
| 2 | 002 | 003 | (1, 0) |
| 3 | 003 | 004 | (1, 0) |

FIG. 10

INFORMATION DISPLAY APPARATUS, METHOD THEREOF AND PROGRAM THEREOF

CROSS-REFERENCE TO RELATED APPLICATIONS

This application is based upon and claims the benefit of priority from the prior Japanese Patent Application No. 2011-247697, filed on Nov. 11, 2011; the entire contents of which are incorporated herein by reference.

FIELD

Embodiments described herein relate generally to an information display apparatus, a method thereof, and a program thereof.

BACKGROUND

A checking apparatus configured to check the state of cable connection of a distribution board on which the cables are connected is proposed. The checking apparatus is configured to pick up images of a state in which cables each adhered with a bar code indicating identification information are connected to connection terminals on a terminal block of the distribution board with a camera, recognize positions and respective identification information of the cables, the terminal block, and the connection terminals from the picked up image, and determine the true-false states of the connections of the cables on the basis of a result of recognition.

However, the bar codes attached to the cables may be overlooked by being shielded by other components or the like. In such a case, in order to perform a true-false determination of all the connections by the checking apparatus described above, an operator needs to pick up images a plurality of times until all the cables are recognized and round up the results of recognition, which causes a problem that the workability of a connection confirmation process is complicated.

DETAILED DESCRIPTION

According to embodiments, there is provided an information display apparatus including: an image acquiring unit configured to acquire an image including objects arranged in a row; a recognizing unit configured to recognize identification information and the position of each of the objects in the image; a storing unit configured to store the identification information of one of the objects arranged in a same row with another one of the objects and a rule indicating the positional relationship between the one of the objects and the another one of the objects in advance on an object-to-object basis; a recognizing unit configured to recognize the identification information of a reference object which is one of the objects to be determined whether or not the arrangement of the objects is correct, the identification information of a target object which is the object arranged in a same row with the reference object, and recognition information including the positional relationship between the reference object and the target object from the image; a determining unit configured to determine whether or not the reference object satisfies the rule using the recognition information relating to the reference object and the rule; a superimposing unit configured to create a determination image indicating that the reference object satisfies the rule or that the reference object does not satisfy the rule, and create an image to be displayed by superimposing the determination image on the image; and a display unit configured to display the image to be displayed.

Referring now to the drawings, the information display apparatus according to one embodiment will be described.

Embodiment 1

Referring now to FIG. 1 to FIG. 7, an information display apparatus 1 according to Embodiment 1 will be described.

The information display apparatus 1 of this embodiment is an apparatus configured to determine whether or not cables are connected correctly when J (J>1) pieces of cables 202 are respectively connected to J points of connection terminals 205 of a terminal block 201 on a distribution board (not shown). In this embodiment, objects to be arranged in a row are the cables 202, and a second object is the terminal block 201.

Figure 2:
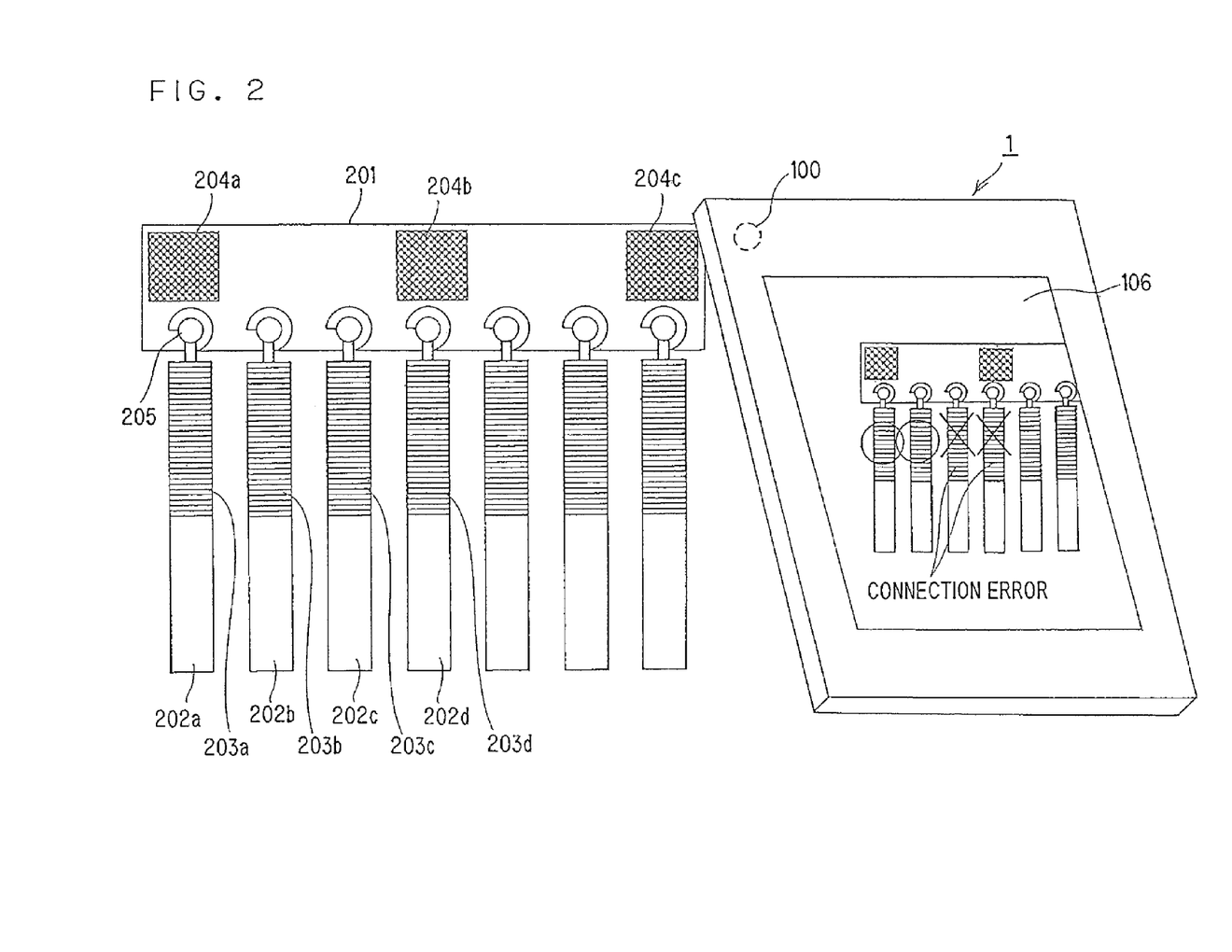
FIG. 2 illustrates an explanatory drawing showing a utilization form of the information display apparatus of Embodiment 1.

The information display apparatus 1 has a form of a handheld device (for example, a tablet-type terminal, a smart phone or the like) including, for example, a display unit 106 such as a liquid crystal panel which displays a moving image to an operator, the terminal block 201 of a distribution board 200, and an image taking unit 100 configured to take moving images of the cables 202 mounted in a single case. The cables 202 each have a tag attached thereon as to be arranged in a row, and each tag has identification information of the corresponding cable 202 indicated by a bar code 203. In addition, the terminal block 201 has a tag of a bar code 204 attached thereon and the tag has identification information of the terminal block 201 indicated by a two-dimensional bar code. When a large number of the cables 202 are to be connected, since the positional relationship can hardly be determined only with one bar code 204, a plurality of tags of bar codes 204 are attached in a row on the single terminal block 201 as shown in FIG. 2.

Figure 1:
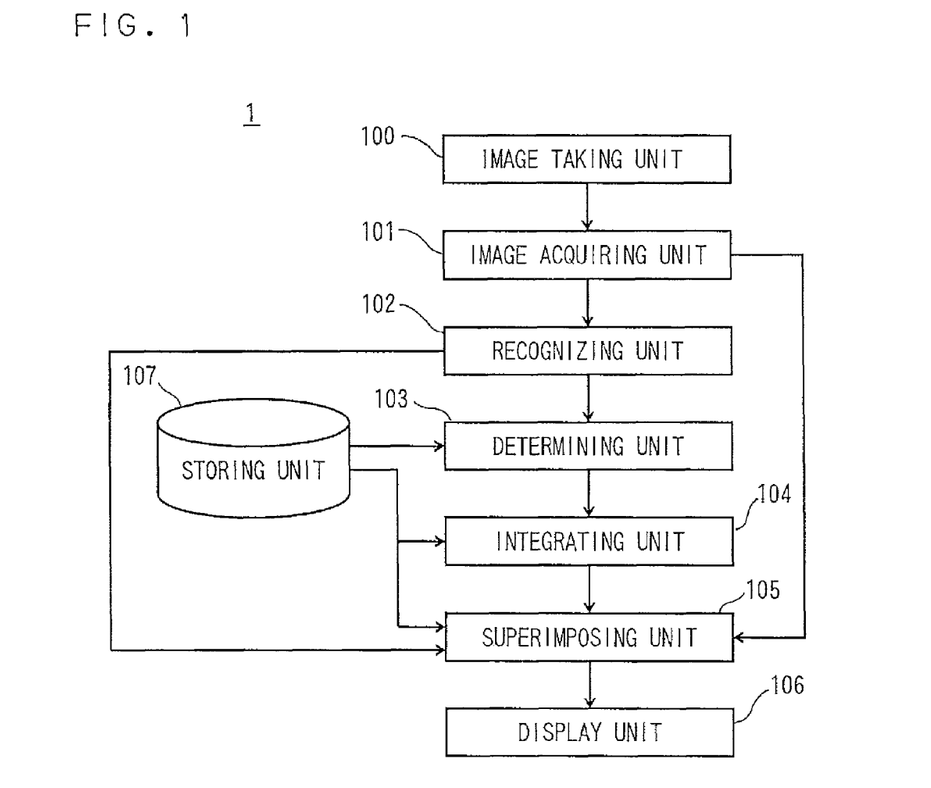
FIG. 1 illustrates a block diagram of an information display apparatus of Embodiment 1.

Referring now to FIG. 1, a configuration of the information display apparatus 1 of the embodiment will be described. FIG. 1 is a block diagram of the information display apparatus 1.

The information display apparatus 1 includes the image taking unit 100, an image acquiring unit 101, a recognizing unit 102, a determining unit 103, an integrating unit 104, a superimposing unit 105, the display unit 106, and a storing unit 107.

The image taking unit 100 is composed of a CCD camera or the like, and takes a moving image of the cables 202 attached with the bar codes 203, the terminal block 201 attached with the bar codes 204, and a state in which the cables 202 are connected to the connection terminals 205 of the terminal block 201.

The image acquiring unit 101 acquires respective frames of the moving image took by the image taking unit 100.

The recognizing unit 102 recognizes the identification information indicated by the bar codes 203 and 204 from the respective frames acquired by the image acquiring unit 101 and the positions of the bar codes 203 and 204 on the frame-to-frame basis.

The storing unit 107 stores the positional relationship between the plurality of bar codes 203 and stores the positional relationship of the bar codes 204 as rules.

The determining unit 103 reads out the rules from the storing unit 107, and determines whether or not the cables 202 included in a single frame satisfy the rules on the basis of the positional relationship of the bar codes 203 and 204 recognized by the recognizing unit 102 from frame-to-frame basis.

The integrating unit 104 determines whether or not all the cables 202 connected to the terminal block 201 satisfy the rules using a plurality of the frames.

The superimposing unit 105 displays an image to be displayed by superimposing a determination image on the cables 202 included in the respective frames.

The display unit 106 displays the image to be displayed output from the superimposing unit 105.

Referring now to FIG. 2, a utilization form of the information display apparatus 1 will be described. FIG. 2 is an explanatory drawing showing the utilization form of the information display apparatus 1.

As shown in FIG. 2, cables 202a to 202d attached with tags on which bar codes 203a to 203d are exhibited are arranged in a row and connected to the respective connection terminals 205 of the terminal block 201 on the distribution board 200. The tags that respectively exhibit the two-dimensional bar codes 204a to 204c indicating the positions of the connection terminals 205 are arranged in a row and attached to the terminal block 201.

When the operator directs the image taking unit 100 on the back surface of the case of the information display apparatus 1 toward the terminal block 201, a result of determination indicating whether or not the cables 202a to 202d connected to the terminal block 201 are connected to correct positions is displayed together with a moving image in the vicinity of the took terminal block 201 on the display unit 106 on the front surface of the case of the information display apparatus 1 so as to be superimposed on the respective cables 202a to 202d and, if there is any connection error such as a connection to a wrong position, that effect is displayed in words. In the case of FIG. 2, a hollow circle is displayed if the connection is correct, and a cross is displayed with the words "connection error" if the connection is wrong so as to be superimposed on the corresponding cable 202.

Figure 3:
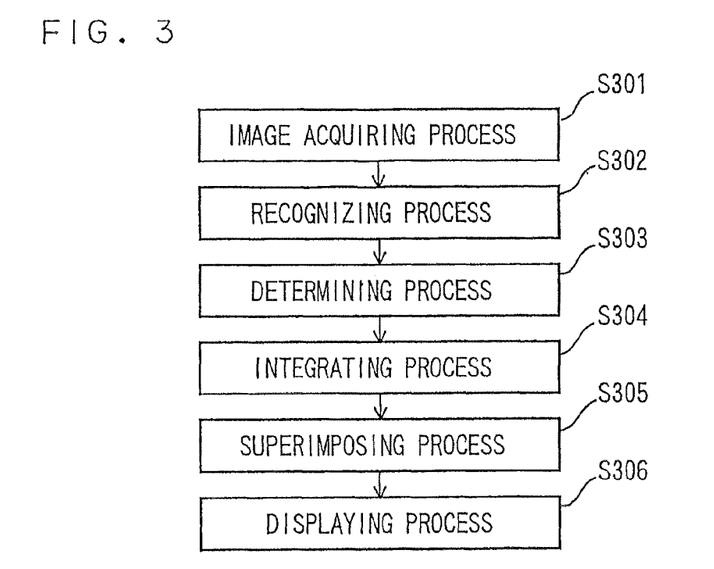
FIG. 3 illustrates a flowchart of the Embodiment 1.

Referring now to FIG. 3, the contents of the process in the information display apparatus 1 will be described. FIG. 3 is a flowchart showing a process of the information display apparatus 1.

In Step S301, the image taking unit 100 takes an image of the cables 202 connected to the terminal block 201 of the distribution board 200, and the image acquiring unit 101 acquires the taken moving image, and then the procedure goes to Step S302.

In Step S302, the recognizing unit 102 recognizes the identification information of the bar codes 203 and 204 arranged in respective rows and the positions of the bar codes 203 and 204 from the respective frames of the acquired moving images from frame-to-frame basis, and the procedure goes to Step S303.

In Step S303, the determining unit 103 determines whether or not the positional relationship of the bar codes 203 and 204 recognized by the recognizing unit 102 satisfies the rules from frame-to-frame basis on the basis of the rules stored in the storing unit 107.

In Step S304, the integrating unit 104 determines whether or not all the cables 202 connected to the terminal block 201 satisfy the rules using a plurality of the frames of the acquired moving image.

In Step S305, the superimposing unit 105 displays an image to be displayed by superimposing a determination image on the cables 202 included in the respective frames.

In Step S306, the display unit 106 displays the image to be displayed.

Here, Step S302, Step S303, Step S304, and Step S305 are a series of processes, and all the processes do not have to be operated synchronously. For example, operation may be such that Step S302 is operated once per second, and Step S303, Step S304 and Step S305 may be operated 10 times per second while utilizing the result of Step S302.

The contents of the process in respective units 100 to 106 of the information display apparatus 1 will be described in sequence in detail.

The image acquiring unit 101 includes the image taking unit 100 which is capable of taking a moving image, and acquires the moving image from the image taking unit 100. The image taking unit 100 is mounted on a back surface of the case of the information display apparatus 1, and is capable of taking images of the terminal block 201. The image taking unit 100 is capable of taking a moving image of, for example, 30 frames/sec., and is capable of taking one frame of 640 pixel in the horizontal direction and 480 pixels in the vertical direction and, in addition, has a mechanism which is capable of adjusting a focal distance automatically, and performs a distortion correcting process for correcting distortion generated in the taken image by an optical system such as lenses.

Figure 4:
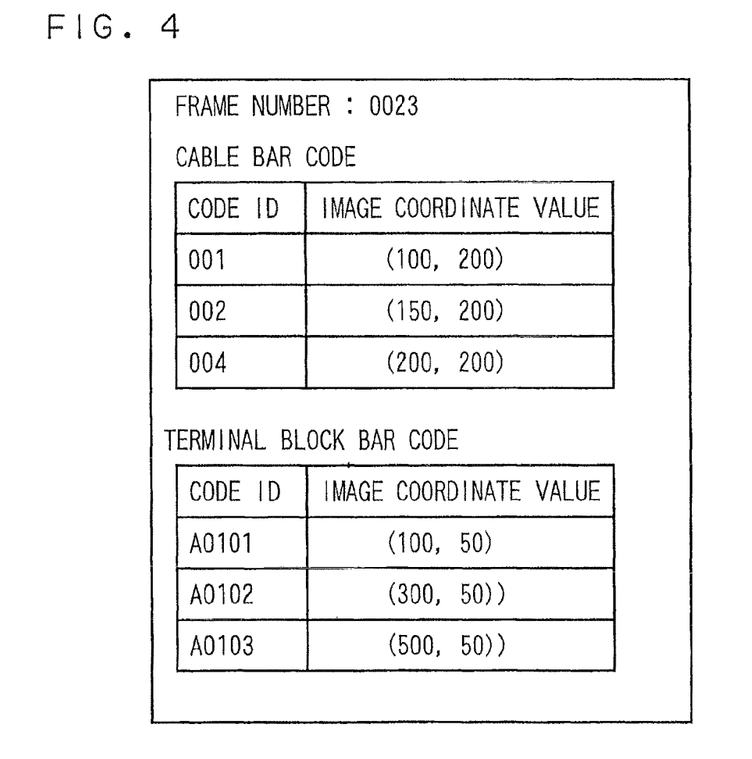
FIG. 4 illustrates an explanatory drawing showing an example of a result of recognition of bar codes in a frame by a recognizing unit of Embodiment 1.

Referring now to FIG. 4, the recognizing unit 102 will be described.

The recognizing unit 102 is configured to recognize the identification information of the bar codes 203 and 204 from the frames acquired by the image acquiring unit 101 on the frame-to-frame basis.

The bar codes recognized by the recognizing unit 102 are both one-dimensional bar codes 203 attached to the cables 202 and two-dimensional bar codes 204 attached to the terminal block 201. The recognizing unit 102 recognizes the bar codes 203 and 204 from frame-to-frame basis of the moving image acquired by the image acquiring unit 101. As shown in FIG. 4, the result of recognition includes a table relating to frame numbers and cable bar codes of the frames subjected to the recognition and a table relating to the bar codes of the terminal block.

The table of the cable bar code includes identification information (cable bar code IDs) of the bar code 203 of the cables 202 arranged in a row and combinations of image coordinate values (X, Y) of the bar codes 203. The term "recognition information" of the cables 202 includes pairs of identification information and the image coordinate values of the bar code 203.

The table of the terminal block bar code includes identification information on the bar codes 204 (terminal block bar code IDs) of the terminal block 201, which are arranged in a row, and combinations of image coordinate values (X, Y) of the bar codes 204. The term "recognition information" of the terminal block 201 includes pairs of identification information and the image coordinate values of the bar code 204.

The image coordinate values (X, Y) are values based on the number of pixels of the frame acquired by the image acquiring unit 101 and, for example, are positions on an image coordinate system having an original point (0, 0) at an upper left of the frame, a positive direction of an X-axis corresponding to a rightward direction, and a positive direction of a Y-axis corresponding to a vertically downward direction and, for example, indicate positions of centers of gravity of the respective areas of the respective recognized bar codes 203 and 204.

Figure 5:
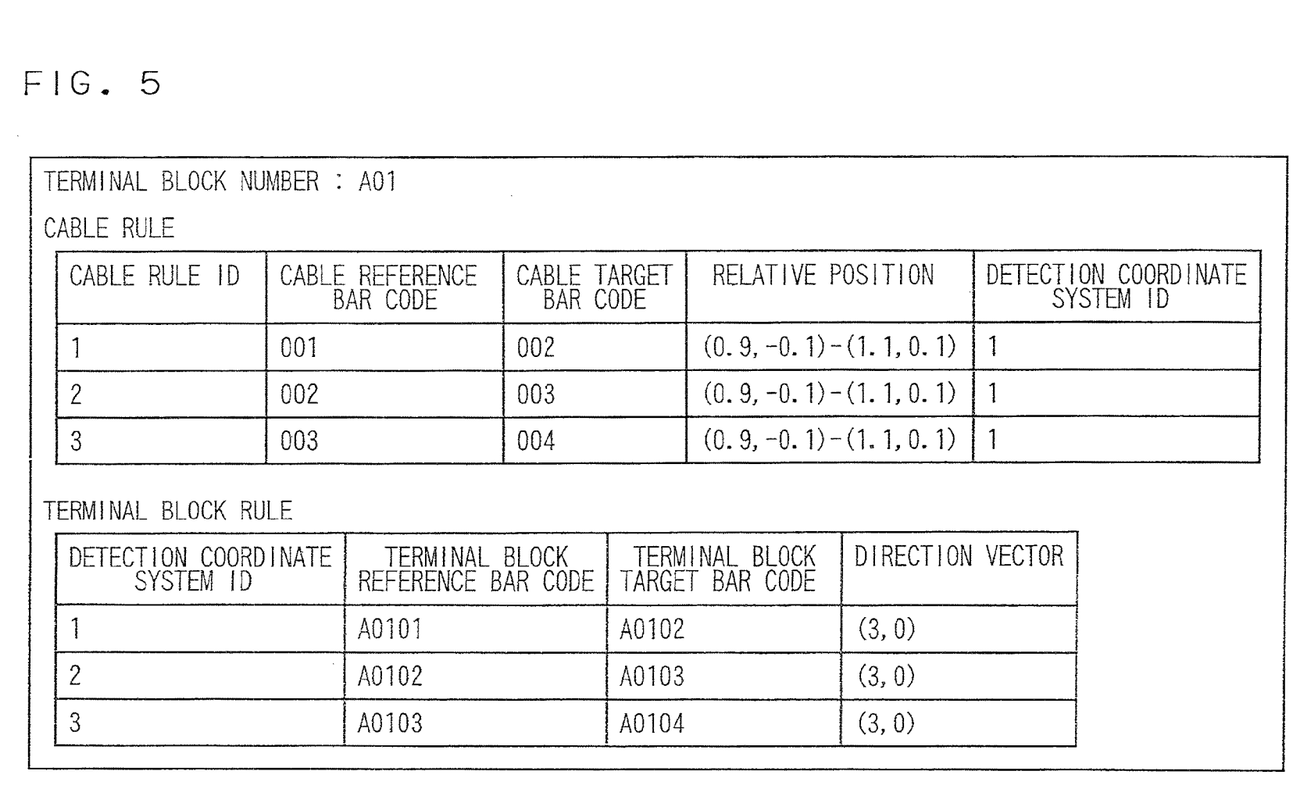
FIG. 5 illustrates an explanatory drawing showing an example of rules stored in a storing unit of Embodiment 1.

Referring now to FIG. 5, the storing unit 107 will be described.

The storing unit 107 stores a table relating to cable rules and a table relating to terminal block rules combined into one as one rule for each of terminal block numbers of the terminal blocks 201 (for example, No. A01) as shown in FIG. 5.

The term "cable rule" is a rule indicating the correct positional relationship between the bar codes 203 of the cables 202 that are arranged in a row and adjacent to each other, when the cable 202 are connected to the terminal block 201 of terminal block No. A01 in a correct state. The term "cable rule ID" is an ID for identifying the cable rule. The term "cable reference bar code" means the identification information of the bar code 203 of the cable 202 which is a reference of the determination, and the term "cable target bar code" means the identification information of the bar code 203 of the cables 202 as an object to be determined, which is different from the cable reference bar code 203 and is arranged in a same row with the cable reference bar code 203. The term "detection coordinate system" indicates a coordinate system used when determining the positional relationship between the bar codes 203 by the determining unit 103 and is defined on the basis of the bar code 204 and the bar code 203, which is a coordinate system different from the image coordinate system. Detailed description will be given below. The term "detection coordinate system ID" means the ID of the detection coordinate system indicated by the bar code 204 to which the cable 202 is connected. The term "relative position" means the positional relationship between the cable reference bar code 203 and the cable target bar code 203, and indicates correct position and direction that the cable target bar code 203 is to be detected when the cable reference bar code 203 is set to be an original point on the detection coordinate system indicated by the detection coordinate system ID by a two-dimensional coordinate system position.

The term "terminal block rule" means a rule indicating the positional relationship of the bar codes 204 and 204 attached to the terminal block 201 of the terminal block number A01 and adjacent to each other. The term "terminal block reference bar code" means identification information of the bar code 204 which acts as a reference of determination, and includes identification number of the bar code 204 (for example, 01) added to the terminal block number A01. The term "terminal block target bar code" means identification information of the bar code 204 which acts as an object of determination different from the terminal block reference bar code 204, and includes identification number of the bar code 204 (for example, 02) added to the terminal block number A01. The term "direction vector" is correct position and direction at which the terminal block target bar code 204 is to be detected when the terminal block reference bar code 204 is set as the original point on the detected coordinate system indicated by the two-dimensional coordinate position (that is, the positional relationship).

The storing unit 107 also includes a buffer and an image buffer separately.

Figure 6:
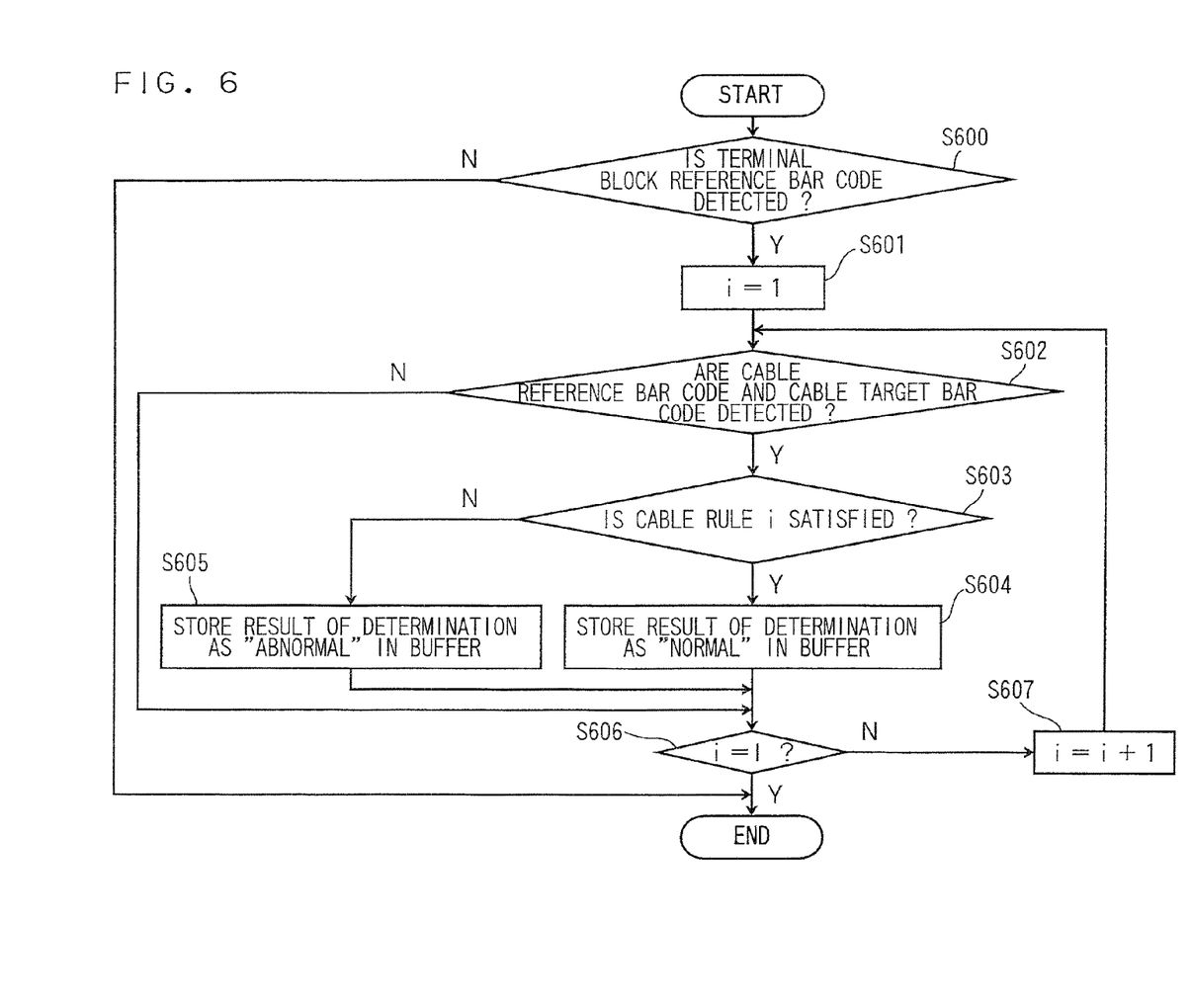
FIG. 6 illustrates a flowchart of a determining unit of Embodiment 1.

Referring now to a flowchart in FIG. 6, the determining unit 103 will be described.

In Step S600, the determining unit 103 determines whether or not the terminal block reference bar code 204 is detected for each of the frames of the acquired moving image. When the terminal block reference bar code 204 is detected, the determining unit 103 moves the procedure to Step S601 (if Y), and terminates the process when the terminal block reference bar code 204 is not detected (if N).

Subsequently, in Step S601, the determining unit 103 uses i ($1 \leq i \leq I$) as an index for pointing all the cable rules, and initializes the cable rule index i with an initial value 1. An upper limit value I means a total number of the cables 202 included in the frame to be determined, and falls in a range $1 \leq I \leq J$ when compared with the number J of all the cables 202 to be connected to the terminal block 201. In other words, if the cable 202 is not included in a certain frame, the value I falls within the range of $1 \leq I < J$. Then, the upper limit value I is determined corresponding to the largest number of the code ID among the identification information of the bar codes 204 included in a certain frame.

Subsequently, in Step S602, the determining unit 103 uses the terminal block reference bar code 204 and reads the cable rule i from the storing unit 107, and determines whether or not the cable reference bar code 203 and the cable target bar code 203 included in the cable rule i are detected in the current frame. When the determining unit 103 detects the both bar codes 203, the procedure goes to Step S603 (if Y), and if not, the procedure goes to Step S606 (if N).

Subsequently, in Step S603, the determining unit 103 determines whether or not the positional relationship between the cable reference bar code 203 and the cable target bar code 203 satisfies the cable rule i. The method of determination will be described later. When the determining unit 103 determines that the positional relationship described above satisfies the cable rule i, the procedures goes to Step S604 (if Y), and if not, the procedure goes to Step S605 (if N).

Subsequently, in Step S604, the determining unit 103, having determined that the cable rule i was satisfied, determines that the result of determination of the cable rule i as "normal" and stores the corresponding frame number in a temporary storing portion (for example, a buffer) of the storing unit 107, and then the procedure goes to Step S606.

Subsequently, in Step S605, the determining unit 103, having determined that the cable rule i was not satisfied, determines that the result of determination of the cable rule i as "abnormal" and stores the corresponding frame number in the buffer, and then the procedure goes to Step S606.

Subsequently, in Step S606, the determining unit 103 determines whether or not the value of i reaches the upper limit value I. When the value of i does not reach the upper limit value I, the procedure goes to Step S607 (if N), and when the value of i reaches the upper limit value I, it is determined that determination of all the cable rules is terminated, and the procedure is terminated (if Y).

Subsequently, in Step S607, the determining unit 103 adds 1 to the cable rule index i, and the procedure goes back to Step S602.

With the process described above, determination of whether or not the cable rule is satisfied is performed on the result of the recognition of the bar code 203 for on one input frame, and the cable reference bar codes 203 which satisfy the cable rule are stored in the buffer together with "normal" and the frame numbers thereof with the identification information of the corresponding cable reference bar codes 203, and the cable reference bar codes 203 which do not satisfy the cable rule are stored in the buffer together with "abnormal" and the frame numbers thereof with the identification information of the corresponding cable reference bar codes 203 as the result of determination.

When there is no bar code 203 recognized with respect to a certain cable rule i, the content of the buffer relating to the corresponding cable rule i is not updated.

Subsequently, the content of the process in Step S603 performed by the determining unit 103 will be described in detail.

First of all, the recognition information of the bar code 203 input in the determining unit 103 includes a pair of the bar code 203 and the image coordinate value as shown in FIG. 4. The image coordinate values are expressed by the image coordinate system.

First of all, the determining unit 103 transforms the image coordinate value expressed by the image coordinate system into a detection coordinate value expressed by the detection coordinate system. The coordinate transformation process is performed on the basis of the positional relationship of the bar codes 204 on each terminal block 201.

For example, the detection coordinate system ID "1" used in the cable rule "1" of the terminal block 201 having the terminal block number A01 in FIG. 5 will be as shown below with reference to the terminal block rule. The detection coordinate system ID "1" is a coordinate system defined by using the detected position of the terminal block reference bar code 204 of A0101 and the detected position of the terminal block target bar code 204 of A0102 in the terminal block rule. Specifically, a coordinate system that the detected position of the terminal block reference bar code 204 of A0101 is set to a new original point, an X-axis is arranged so that the detected position of the terminal block target bar code 204 of A0102 comes to a coordinate (3, 0), and a Y-axis is arranged in the direction rotated counterclockwise from the X-axis by 90 degrees is the detection coordinate system ID "1". Accordingly, the detected position of the terminal block reference bar code 204 of A0101 and the detected position of the terminal block target bar code 204 of A0102 come to (0, 0) and (3, 0) in the detection coordinate system ID "1". This process may be expressed by 3 rows 3 columns affine transformation matrix. This transforming process is a transforming process from the image coordinate system to the detection coordinate system.

In the cable rule "1" in FIG. 4, the cable reference bar code 203 having a cable code ID "001" and the cable target bar code 203 having a cable code ID "002" are transformed from the image coordinate system to the detection coordinate system by using this transforming process and, if the relative position of the cable target bar code 203 of the cable code ID "002" with respect to the cable reference bar code 203 having the cable code ID "001" falls within a range of 0.9 to 1.1 inclusive in terms of the X-axis and a range from −0.1 to 0.1 inclusive in terms of Y-axis, the determining unit 103 determines that the cable rule 1 is satisfied.

The determining unit 103 applies the above-described process for each of the cable rules.

Figure 7:
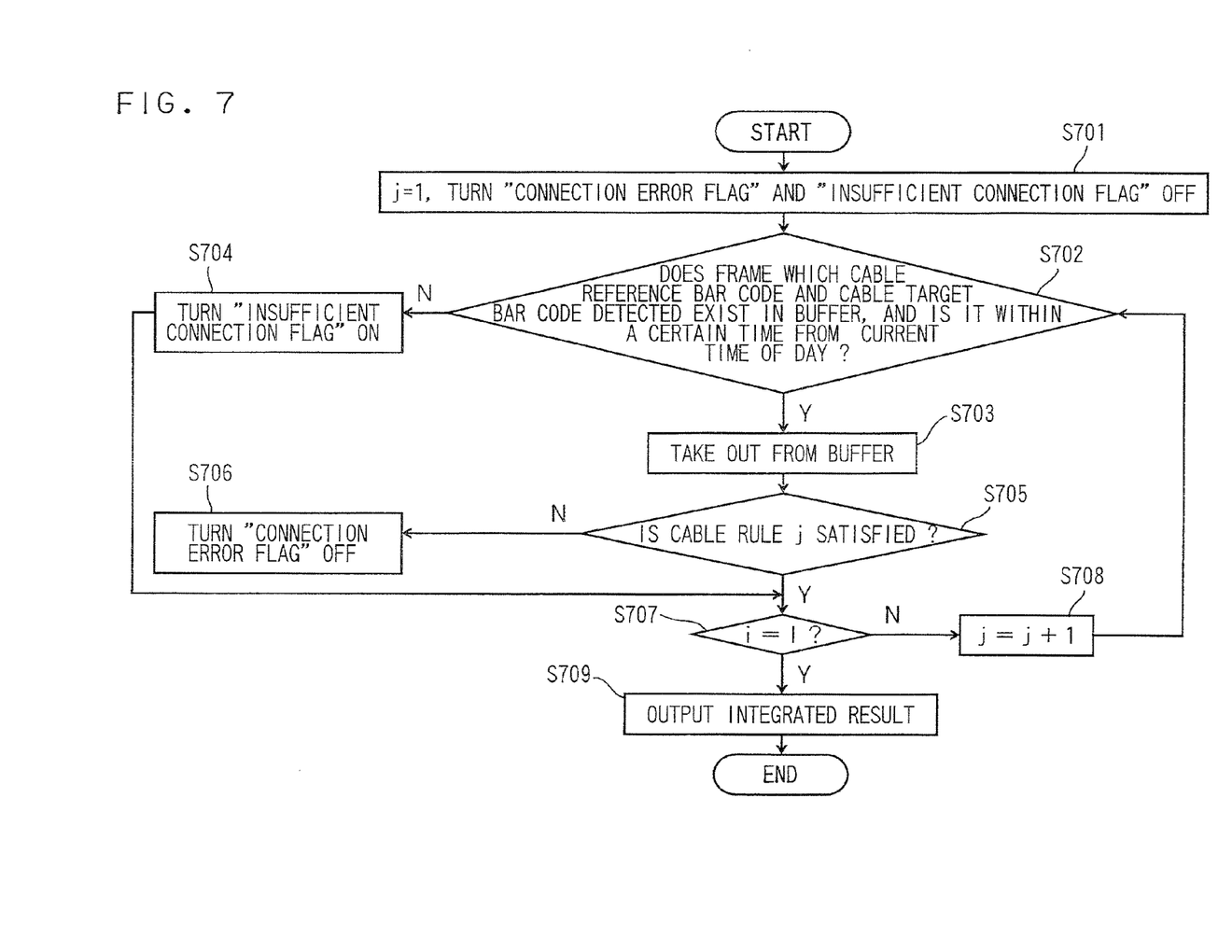
FIG. 7 illustrates a flowchart of an integrating unit of Embodiment 1.

Referring now to the flowchart in FIG. 7, the content of process of the integrating unit 104 will be described.

First of all, the integrating unit 104 uses "j" ($1 \leq j \leq J$) as an index for pointing all the cable rules, and initializes the cable rule index j with an initial value of 1. The index j used here is independent from the index i used in the determining unit 103, and the upper limit value J means a total number of the cables 202 to be connected to the terminal block 201 having the terminal block number A01.

In Step S701, the integrating unit 104 initializes a "connection error flag" and an "insufficient connection flag" to be used for temporary storage of the result of determination as the connection error or the insufficient connection with respect to the entire terminal block 201 to OFF.

Subsequently, in Step S702, the integrating unit 104 determines whether or not there exists a frame which detects both of the cable reference bar code 203 and the cable target bar code 203 included in the cable rule index j in a buffer and the time of day when the image of the frame is picked up (detected time) falls within a certain period with reference to the current time of day. The integrating unit 104 moves to Step S703 if such a frame exist (if Y), and if not, moves to Step S704 (if N).

Subsequently, in Step S703, the integrating unit 104 takes out the result of determination of the existing frame from the buffer, and moves to Step S705. The result of determination includes the frame number corresponding to the existing frame, the identification information of the cable reference bar code 203, and "normal"/"abnormal" which are determined by the determining unit 103.

Subsequently, in Step S704, since there is no such the frame existing, the integrating unit 104 turns ON the insufficient connection flag relating to the cable reference bar code 203 which should have been included in the corresponding frame and stores the corresponding cable reference bar code 203 in the buffer, and the procedure goes to Step S707.

Subsequently, in Step S705, the integrating unit 104 determines whether or not the cable reference bar code 203 is "normal" or "abnormal" on the basis of the result of determination taken out from the buffer. When the cable reference bar code 203 is "normal", the integrating unit 104 determines that the cable rule j is satisfied and moves to Step S707 (if Y) and, if the cable reference bar code 203 is "abnormal", moves to Step S706 (if N).

Subsequently, in Step S706, since the cable reference bar code 203 does not satisfy the cable rule j, the integrating unit 104 turns ON the connection error flag relating to the cable reference bar code 203 and stores the corresponding cable reference bar code 203 in the buffer, and the procedure goes to Step S707.

Subsequently, in Step S707, the integrating unit 104 determines whether or not the determination of all the cable rules (cable rules 1 to J) has completed. If the determination for all the cable rules are completed, the procedure goes to Step S709 (if Y), and if not, the procedure goes to Step S708 (if N).

Subsequently, in Step S708, the integrating unit 104 adds 1 to the cable rule index j, and the procedure goes back to Step S702.

Subsequently, in Step S709, the integrating unit 104 outputs the integrated result about all the cable rules (cable rules 1 to J) on the basis of ON/OFF of the connection error flag and the insufficient connection flag.

The superimposing unit 105 and the display unit 106 will be described.

The superimposing unit 105 first of all copies a certain frame (for example, a frame having a frame number m) acquired by the image acquiring unit 101 into an image temporary storing portion (for example, an image buffer) of the storing unit 107.

Subsequently, the superimposing unit 105 reads out the detection coordinate values of the cable reference bar codes 203 expressed by the detection coordinate system for each of the cable rules and the integrated result of the cable reference bar code 203 (ON/OFF of the connection error flag and ON/OFF of the insufficient connection flag) on the cable rules stored in the buffer relating to the frame having the frame number m.

Subsequently, the superimposing unit 105 obtains a position which is the detection coordinate value of the cable reference bar code 203 relating to the frame having the frame number m converted from the detection coordinate system to the image coordinate system.

Subsequently, the superimposing unit 105 determines whether the "connection error flag" is ON, the "insufficient connection flag" is ON, or the both flags are OFF by using the read integrated result for each of the cable reference bar codes 203. The superimposing unit 105 creates a determination image in which a mark "x" and "connection error" are displayed when the "connection error flag" is ON, creates a determination image in which the mark "x" and "insufficient connection" are displayed when the "insufficient connection flag" is ON, and creates a determination image in which the hollow circle "O" is displayed when the both flags are OFF.

Subsequently, the superimposing unit 105 creates an image to be displayed by superimposing the determination image on the position of the cable reference bar code 203 transformed into the image coordinate system. It is also possible to superimpose an image expressing the numbers of the cable reference bar code 203 in character string (001, 002, and so forth).

Subsequently, the superimposing unit 105 outputs the image to be displayed for m-th frame to the display unit 106.

The display unit 106 displays the image to be displayed of for the m-th frame. In other words, the above-described process is performed for each frame, and a moving image on which the image to be displayed is superimposed is displayed for the operator.

In this embodiment, since the images to be displayed indicating the determination of the connection of the connected cables 202 are displayed so as to be superimposed on the moving image in which the terminal block 201 is included, the true-false determination of the wired connection is achieved even in the environment in which overlooking of the bar code 203 is liable to occur. Also, by displaying the moving image while superimposing the result of true-false determination of the connection thereon, visual association is enabled and hence the workability is improved.

In addition, the true-false determination is performed even in the environment where the overlooking of the bar code 203 is liable to occur due to the blocking of the tag such as an area where the cables 202 are intensively provided, and hence the workability is improved.

Also, usability in the environment in which the noise of the sensor is liable to occur at dark sites, and hence the overlooking of the bar code 203 is liable to occur is also improved.

Embodiment 2

Figure 8:
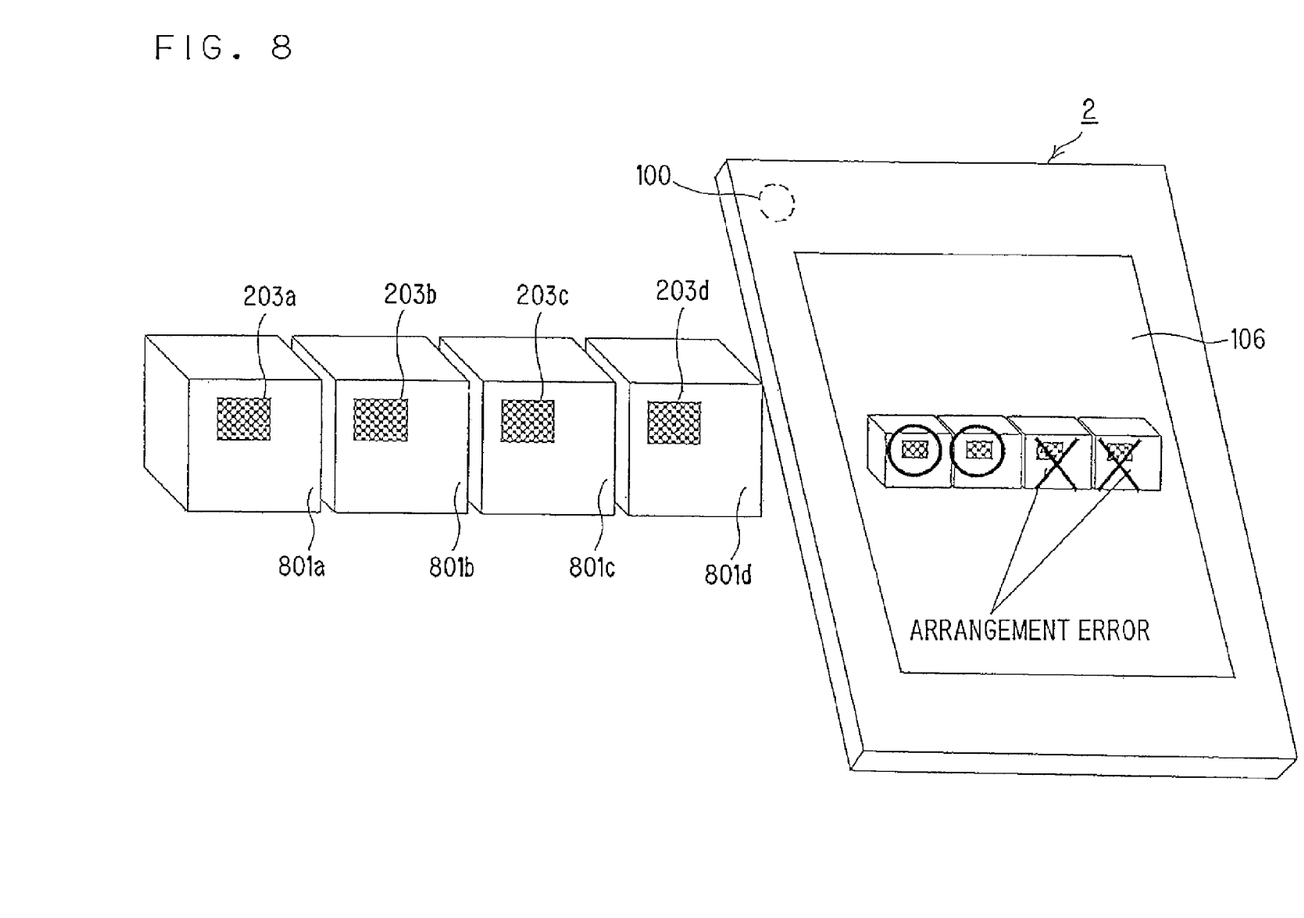
FIG. 8 illustrates an explanatory drawing showing an utilization form of the information display apparatus of Embodiment 2.
Figure 9:
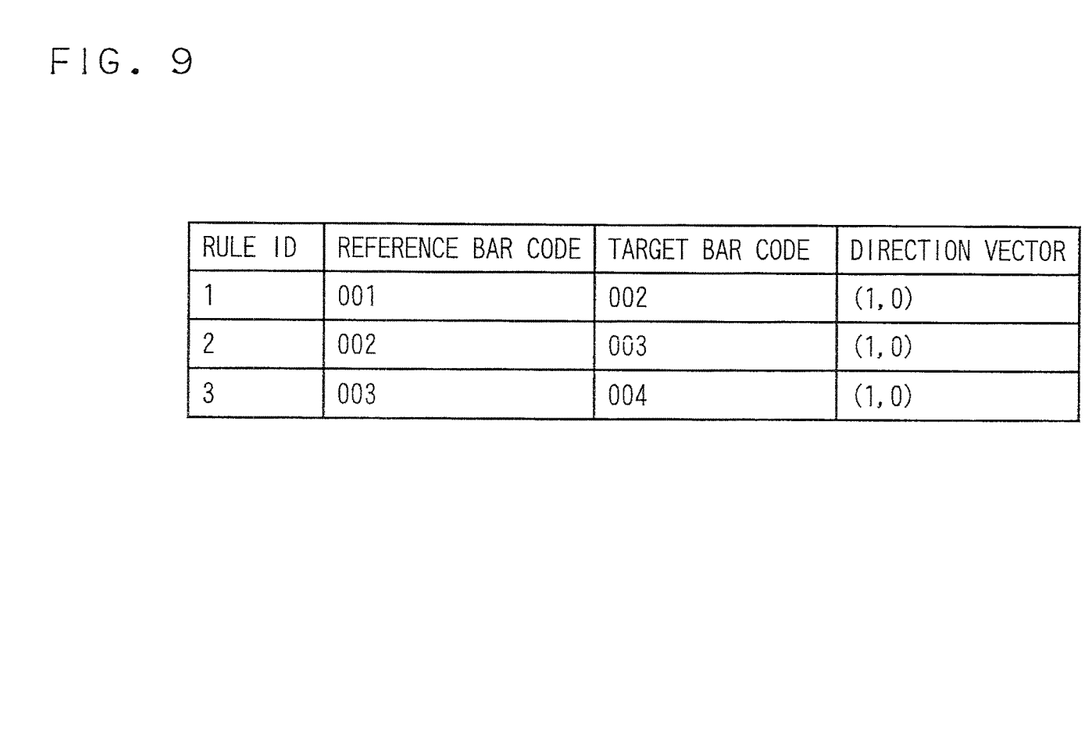
FIG. 9 illustrates an explanatory drawing showing an example of rules stored in a storing unit of Embodiment 2.
Figure 10:
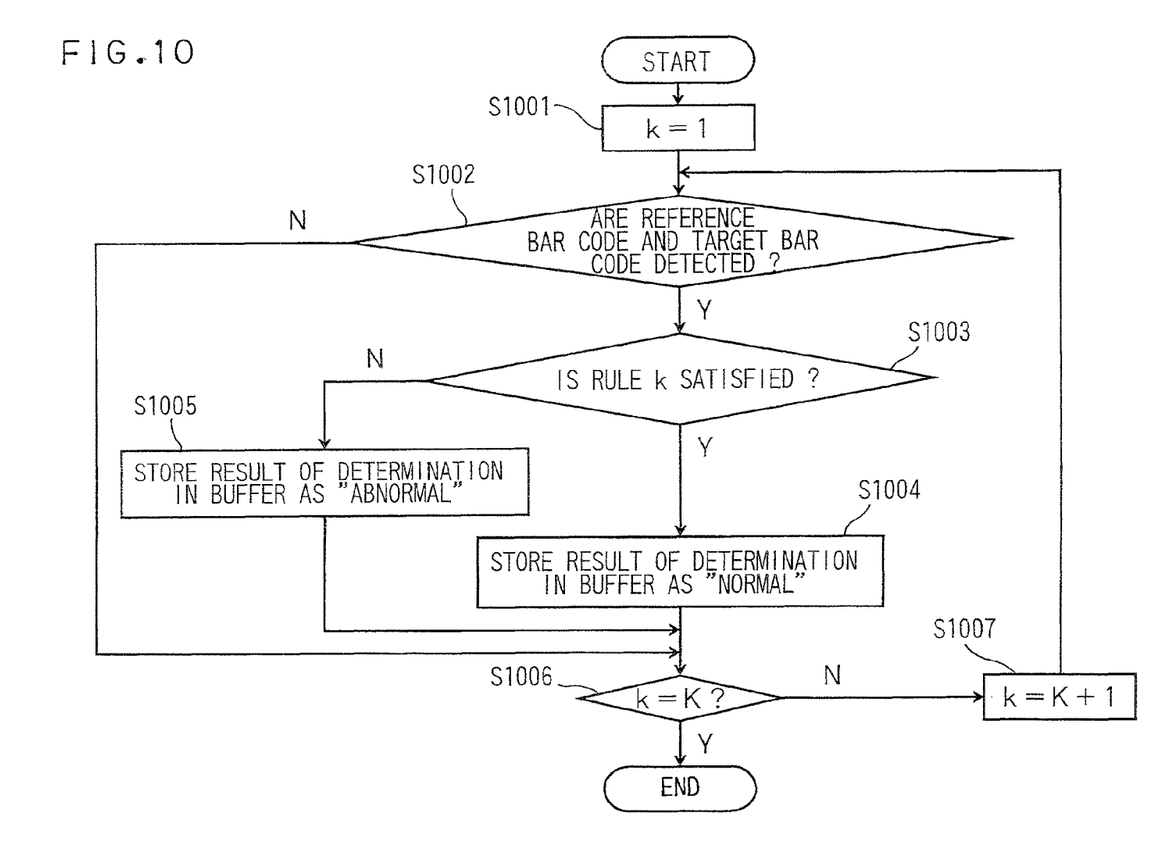
FIG. 10 illustrates a flowchart of a determining unit of Embodiment 2.

Referring now to FIG. 8 to FIG. 10, an information display apparatus 2 according to Embodiment 2 will be described.

The information display apparatus 2 in the embodiment confirms the correctness of the arrangement of the goods when markers are attached only to the goods without a marker which acts as a reference of the position like a case where goods such as books or articles are arranged in a row as the objects. For example, the information display apparatus 2 may be used for an operation for confirming the arrangement of the books arranged in a row in the bookshelf, articles arranged in a row in a warehouse (for example, carton boxes in which products are stored).

The information display apparatus 2 has a form of a handheld device including the image taking unit 100 configured to take a moving image with respect to the operator, and the display unit 106 such as a liquid crystal panel for displaying the images to be displayed.

Goods 801a to 801d arranged in a row are attached with tags on which the identification information is shown by the bar codes 203a to 203d.

Since the configuration of the information display apparatus 2 in this embodiment is the same as that of the information display apparatus 1 in Embodiment 1, description will be omitted (see FIG. 1).

Referring now to FIG. 8, the utilization form of the information display apparatus 2 in this embodiment will be described.

When the operator directs the image taking unit 100 of the information display apparatus 2 toward the goods 801a to 801d, the result of determination of whether or not the goods 801a to 801d are arranged in a row in the correct order is displayed together with the taken moving image of the goods 801a to 801d on the display unit 106 of the information display apparatus 2 so as to overlap the respective goods and, if there is an arrangement error, that event is displayed in words.

The configuration and the functions different from Embodiment 1 will be described.

In the storing unit 107, rules indicating the positional relationships between goods in a case where the goods are arranged in a correct state are stored. An example of the stored content will be shown in FIG. 9.

The term "rule ID" indicates the IDs of the rules.

The term "reference bar code" indicates the identification information of the bar codes 203 which act as references.

The term "target bar code" indicates the identification information of the bar codes 203 different from the reference bar codes 203.

The term "direction vector" indicates the position and the direction where the target bar code 203 is detected when the reference bar code 203 is used as the reference position by the two-dimensional coordinate value on the image coordinate system.

Referring now to FIG. 10, the content of process of the determining unit 103 will be described.

First of all, in Step S1001, the determining unit 103 uses k ($1 \leq k \leq K$) as an index for pointing all the rules. The cable rule index k is initialized by an initial value of 1.

Subsequently, in Step S1002, the determining unit 103 reads the rule k from the storing unit 107, and determines whether or not the reference bar code 203 and the target bar code 203 included in the rule k are detected in the current frame. When the determining unit 103 detects the both bar codes 203, the procedure goes to Step S1003 (if Y), and if not, the procedure goes to Step S1006 (if N).

Subsequently, in Step S1003, the determining unit 103 determines whether or not the positional relationship between the reference bar code 203 and the target bar code 203 satisfies the rule k. The method of determination will be described later. When the determining unit 103 determines that the positional relationship described above satisfies the rule k, the procedures goes to Step S1004 (if Y), and if not, the procedure goes to Step S1005 (if N).

Subsequently, in Step S1004, the determining unit 103, having determined that the rule k was satisfied, determines that the result relating to the reference bar code 203 as "normal" and stores the identification information of the reference bar code 203 together with the corresponding frame number in the buffer, and then the procedure goes to Step S1006.

Subsequently, in Step S1005, the determining unit 103, having determined that the rule k was not satisfied, determines that the result relating to the bar reference code 203 as "abnormal" and stores the identification information of the reference bar code 203 together with the corresponding frame number in the buffer, and then the procedure goes to Step S1006.

Subsequently, in Step S1006, the determining unit 103 determines whether or not the value k is the upper limit value K of the rule index. The determining unit 103 moves to Step S1007 (if N) when the value of k does not reach the upper limit value K, and determines that determination of all the rules is terminated when the value of k reaches the upper limit value K (if Y), and the procedure is terminated.

Subsequently, in Step S1007, the determining unit 103 adds 1 to the rule index k, and the procedure goes back to Step S1002.

From the process described above, the determining unit 103 stores the identification information of the reference bar code 203 in the buffer together with the result of recognition of the bar code 203 for the input one frame, that is, "normal" when the rule is satisfied, and "abnormal" when the rule is not satisfied together with the frame number.

When there is no bar code 203 recognized with respect to a certain rule, the content of the corresponding buffer is not updated.

Subsequently, the content of the process in Step S1003 will be described in detail.

The recognition information of the bar code 203 input in the determining unit 103 includes a pair of the identification information of the bar code 203 and the image coordinate value as shown in FIG. 9. The image coordinate values are expressed by the image coordinate system. In this embodiment, the process is performed in the image coordinate system.

The determining unit 103 determined that the rule 1 is satisfied as long as an angle formed between the detected direction vector of the reference bar code 203 of 002 with respect to the reference bar code 203 of 001 detected in the current frame and a direction vector stored in the rule "1" is within a threshold value.

The process described above is applied to the respective rules.

According to the embodiment, whether or not the arrangement of the goods in a row is correct can be checked, and the true-false determination can be performed even in the environment in which the bar code 203 is liable to be overlooked.

Also, by displaying the moving image while superimposing the result of true-false determination of the arrangement of the goods in a row, visual association is enabled and hence the workability is improved.

Modification

Although the handheld device has been described as the information display apparatus in the embodiment described above, the invention is not limited thereto, and may be applied to industry plants or distribution equipment by mounting on next-generation personal computer or handheld information terminal.

Although one-dimensional bar codes and two-dimensional bar codes are used as the identification information in the above-described embodiment, the invention is not limited thereto, and may be displayed, for example, by colors, characters, and numerical characters.

Although the acquired image is a moving image, the determination is performed from frame-to-frame basis, and the results of the respective frames are integrated later so that the result of determination of the connecting state of all the cable is obtained in the embodiment described above. However, a configuration in which the acquired image is a still image, and the connecting state is determined only for the cable included in the still image is also applicable instead.

The positional relationship in the above-described embodiment is the relative position and the direction vector. However, the relative direction is also applicable.

The information display apparatus 1 may be implemented using, for example, a general-purpose computer as a basic hardware. In other words, the image taking unit 100, the image acquiring unit 101, the recognizing unit 102, the determining unit 103, the integrating unit 104, the superimposing unit 105, the display unit 106, and the storing unit 107 may be implemented by causing a processor mounted on the computer described above to execute a program. At this time, the information display apparatus 1 may be implemented by installing the above-described program on the computer in advance, or may be implemented by storing the program in a recording medium such as a CD-ROM or by distributing the program described above via a network, thereby allowing the user to install the program on the computer as needed. For example, the information display apparatus 1 may be a smart phone and the program described above may be delivered to the smart phone.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information display apparatus comprising:
a processor configured to acquire an image, in which first objects are arranged in a row on a second object, to recognize identification information on each of the first objects and a position, in the acquired image, of each of the first objects, as well as a point on the second object and a position, in the acquired image, of the point, and to set the recognized point on the second object as an origin point;
storage configured to store identification information of one of the first objects, which is a reference object, and identification information of another one of the first objects, which is a target object and arranged in a same row with the reference object, and a first rule indicating a positional relationship, which includes a relative position, a relative direction and a direction vector, between the reference object and the target object, in advance on an object-to-object basis in respect of each of the first objects; and
a display,
wherein the processor is further configured to at least:
determine, based on the origin point, whether or not the position in the acquired image, of the reference object satisfies the first rule by using the position of the reference object and the position in the acquired image of the target object;

if the position of the reference object is determined to satisfy the first rule, create a determination image indicating that the position of the reference object satisfies the first rule, and, if the reference object is determined not to satisfy the first rule, create a determination image indicating that the position of the reference object does not satisfy the first rule;

create a display image for display on the display by superimposing the created determination image on the reference object in the acquired image;

wherein the storage further stores identification information of the second object and a second rule specifying the positional relationship of the first rule by using a two-dimensional coordinate system based on the origin point; and the processor is further configured to recognize the origin point and the positions, in the acquired image, of the reference and target objects and to determine whether or not the position, in the acquired image, of the reference object satisfies the positional relationship of the first rule specified by the second rule in the coordinate system, by using the position of the second object, the position of the reference object, and the position of the target object.

2. The apparatus according to claim 1, wherein the acquired image is a frame of a moving image; the processor is further configured to determine if the reference object satisfies the first rule on a frame-to-frame basis and to integrate the frame-to-frame determination into one determination.

3. The apparatus according to claim 1, wherein the first objects are cables.

4. The apparatus according to claim 1, wherein the second object is a terminal block to which cables are connected.

5. An information display method comprising:

acquiring an image in which including first objects are arranged in a row on a second object;

recognizing identification information on each of the first objects and a positions in the acquired image, of each of the first objects, as well as a point on the second object and a position, in the acquired image, of the point;

setting the recognized point on the second object as an origin point;

storing identification information of one of the first objects, which is a reference object, and the identification information of another one of the first objects, which is a target object image and arranged in a same row with the reference object, and a first rule indicating a positional relationship, which includes a relative position, a relative direction and a direction vector between the reference object and the target object, in advance on an object-to-object basis in respect of each of the first objects;

determining, based on the origin point, whether or not the position in the acquired image, of the reference object satisfies the first rule by using the position of the reference object and the position, in the acquired image, of the target object;

creating a determination image indicating that the position of the reference object satisfies or does not satisfy the first rule;

creating a display image for display by superimposing the created determination image on the reference object in the acquired image; and displaying the display image on a display;

further storing identification information of the second object and a second rule specifying the positional relationship of the first rule by using a two-dimensional coordinate system based on the origin point; and further recognizing the origin point and the positions, in the acquired image, of the reference and target objects and determining whether or not the position, in the acquired image, of the reference object satisfies the positional relationship of the first rule specified by the second rule in the coordinate system, by using the position of the second object, the position of the reference object, and the position of the target object.

6. A program stored in a non-transitory computer readable medium, the program, when executed by a computer of an information processing apparatus, causing the computer to control the information processing apparatus to at least:

acquire an image, in which including first objects are arranged in a row on a second object;

recognize identification information on each of the first objects and a position, in the acquired image, of each of the first objects, as well as a point on the second object and a position, in the acquired image, of the point;

set the recognized point on the second object as an origin point;

store identification information of one of the first objects, which is a reference object, and identification information of another one of the first objects, which is a target image and arranged in a same row with the reference object, and a first rule indicating a positional relationship, which includes a relative position, a relative direction and a direction vector between the reference object and the target object, in advance on an object-to-object basis in respect of each of the first objects;

determine, based on the origin point, whether or not the position, in the acquired image, of the reference object satisfies the first rule using the position of the reference object and the position, in the acquired image, of the target object;

if the reference object is determined to satisfy the first rule, create a determination image indicating that the reference object satisfies the first rule, and, if the reference object is determined not to satisfy the rule, create a determination image indicating that the reference object does not satisfy the first rule;

create a display image for display by superimposing the created determination image on the reference object in the acquired image; and display the display image on a display;

further store identification information of the second object and a second rule specifying the positional relationship of the first rule by using a two-dimensional coordinate system based on the origin point; and further recognize the origin point and the positions, in the acquired image, of the reference and target objects and to determine whether or not the position, in the acquired image, of the reference object satisfies the positional relationship of the first rule specified by the second rule in the coordinate system, by using the position of the second object, the position of the reference object, and the position of the target object.

* * * * *